July 12, 1932.

E. R. JONES.

AUTOMOBILE BUMPER.

APPLICATION FILED JAN. 9, 1922.

Original Filed Jan. 9, 1922

Re. 18,519

Inventor

E.R. Jones.

By C. A. Snow & Co.

Attorneys

Reissued July 12, 1932

Re. 18,519

UNITED STATES PATENT OFFICE

EVERETT R. JONES, OF WYANDOTTE, MICHIGAN, ASSIGNOR, BY MESNE ASSIGNMENTS, TO JOSEPH J. SCHEIBEL

AUTOMOBILE BUMPER

Original No. 1,416,834, dated May 23, 1922, Serial No. 527,960, filed January 9, 1922. Application for reissue filed May 23, 1932. Serial No. 613,329.

This invention relates to a bumper for automobiles, one of its objects being to provide an attractive and durable structure of this character so constructed as to more readily absorb shocks than will bumpers of the usual types, there being a novel movable connection between certain of the bumpers whereby the bumper is enabled to be made wider than ordinarily, will stand excessive shocks, and can be used to protect not only the front of the body of the car but also the fenders.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing the preferred form of the invention has been shown.

In said drawing—

Figure 1:
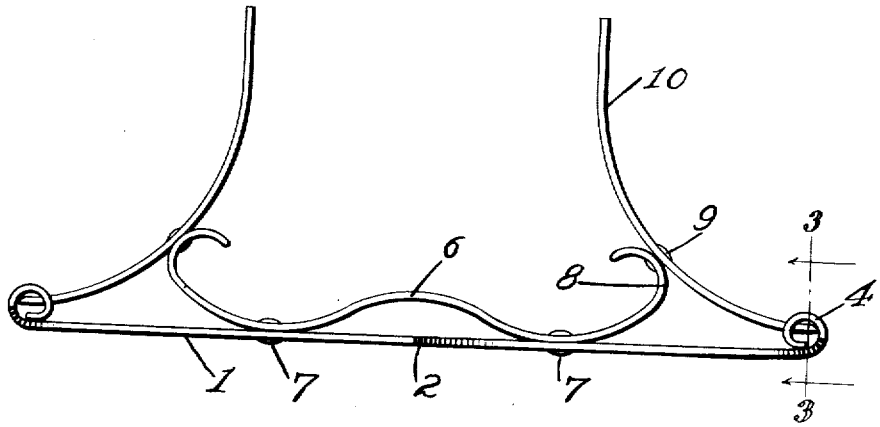
Figure 1 is a plan view of the bumper.
Figure 2:
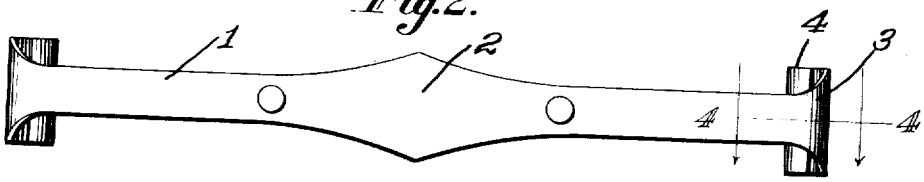
Figure 2 is a front elevation thereof.
Figure 3:
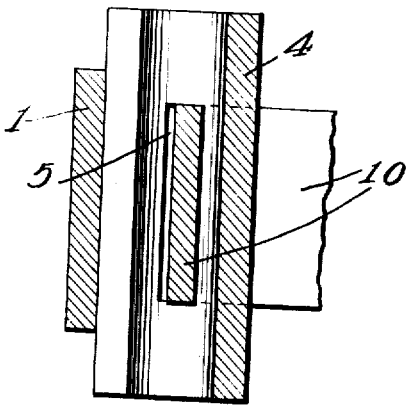
Figure 3 is an enlarged section on line 3—3, Figure 1.
Figure 4:
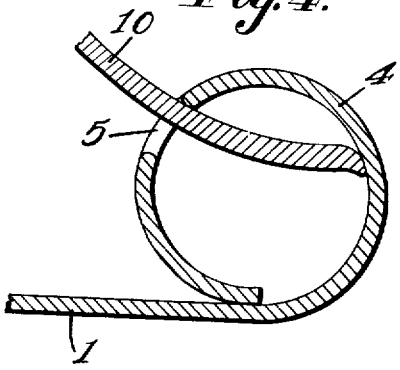
Figure 4 is an enlarged section on line 4—4, Figure 2.

Referring to the figures by characters of reference 1 designates the front cross strip of the bumper, this strip being preferably of greater width at the center than at other points, the wide portion being indicated at 2. The ends of the strip are of increased width as shown at 3 and are curled or rolled backwardly and inwardly to provide terminal barrels 4 each of which has a vertical slot 5 in the inner side portion thereof. Arranged back of the strip 1 is a bow string 6 fastened by rivets 7 or the like to the strip 1 at opposite sides of the enlarged portion 2. The ends of this spring are curved backwardly and inwardly as shown at 8 and are riveted or otherwise fastened as at 9 to side strips 10. These side strips are of strong spring metal and their forward ends project through the slots 5 and bear against the walls of the barrels 4. There are no connecting means provided for securing the strips 9 to the barrel. On the contrary there is both a slidable and pivotal connection provided between these parts by reason of the peculiar manner in which they are assembled. The rear ends of the strips 10 are adapted to be fastened to an automobile in the usual or any preferred manner.

When the device is in position the ends of the strip 1 will be extended laterally sufficient distances to protect the fenders of the vehicle. Any shock received by the middle portion of the strip 1 will be transmitted to the spring 6 and thence to the curved spring side strips 10. As the side strips have a sliding as well as a pivotal connection with the barrels 4 the bumper can receive an extremely severe shock without becoming injured because a backward impact against the center of the strip 1 will allow the ends of the strip to have a slight forward movement upon and relative to the strips 10. Thus the shock will be more readily absorbed than should the parts 10 and 1 be integral.

What is claimed is:—

1. A bumper for automobiles and the like comprising a front strip having terminal barrels, and forwardly diverging side strips projecting into and adapted to slide and swing within the barrels, all of the strips being of spring material.

2. A bumper for motor vehicles comprising a front strip having rearwardly turned end portions, side strips diverging forwardly and slidable within said end portions, said side and front strips being formed of spring material, and a spring connection between the front and side strips.

3. A bumper for motor vehicles comprising a front strip having backwardly curled end portions provided with slots, forwardly diverging side strips projecting into the slots in the respective curled portions and mounted to move freely therein, a bow spring secured back of the front strip, and curved spring connections integral with the bow spring and joining the front and side strips, said front and side strips being formed of spring material.

4. A bumper for automobiles and the like comprising a front impact strip structure provided with terminal barrels, and forwardly diverging side strip portions projecting into and adapted to slide and swing within the barrels, all of the strips being of spring material, said strip portions each being of a lesser width than said front strip structure and each extending into an opening in the corresponding barrel for sliding movement with respect to edges of the barrel defining such opening.

5. A bumper for automobiles and the like comprising a front impact strip structure provided with terminal barrels, and forwardly diverging side strip portions projecting into and adapted to slide and swing within the barrels, all of the strips being of spring material, said strip portions each being of a lesser width than said front strip structure and each extending into an opening in the corresponding barrel for pivotal movement therein, each of said barrel openings being defined by upper and lower shoulders for preventing vertical displacement of the corresponding strip portion therefrom.

6. A bumper for automobiles and the like comprising a front impact strip structure provided with terminal barrels, and forwardly diverging side strip portions projecting into and adapted to slide and swing within the barrels, all of the strips being of spring material, said strip portions each being of a lesser width than said front strip structure and each extending into an opening in the corresponding barrel for pivotal movement therein, each of said barrel terminals including cylinder sections above and below the barrel opening for engagement with the upper and lower edges of the corresponding strip portion extending in such opening.

7. A bumper for automobiles and the like comprising a front impact strip structure provided with terminal barrels, and forwardly diverging side strip portions projecting into and adapted to slide and swing within the barrels, all of the strips being of spring material, said terminal barrels including vertical openings into which said strip portions are sprung to pivotally connect such portions to said barrels.

8. A bumper for automobiles and the like comprising a front impact strip structure provided with terminal barrels, and forwardly diverging side strip portions projecting into and adapted to slide and swing within the barrels, all of the strips being of spring material, said terminal barrels including vertical openings into which said strip portions are sprung to pivotally connect such portions to said barrels, and so as to eliminate the need for any other connecting means between said portions and said barrels.

9. A bumper for automobiles and the like comprising a front impact strip structure provided with terminal barrels, and forwardly diverging side strip portions projecting into and adapted to slide and swing within the barrels, all of the strips being of spring material, said terminal barrel including vertical openings through which said strip portions project into the interior of the barrels, each of said strip portions having its end inside the corresponding barrel frictionally bound to the wall of the barrel by the springing of such end into the barrel.

10. A bumper for automobiles and the like comprising a front impact strip structure provided with terminal barrels, and forwardly diverging side strip portions projecting into and adapted to slide and swing within the barrels, all of the strips being of spring material, each of said strip portions being pivotally connected to the associated barrel solely by the springing of an end of the portion through an opening in the barrel into frictional engagement with the interior wall of the barrel whereby such portion is at all times urged into tight frictional contact with the barrel by the springiness of the material comprising the portion but is at the same time capable of pivotal movement with respect to the barrel.

In testimony whereof I have hereunto subscribed my name at Wyandotte, Wayne County, Michigan.

EVERETT R. JONES.

CERTIFICATE OF CORRECTION.

Reissue Patent No. 18,519. July 12, 1932.

EVERETT R. JONES.

It is hereby certified that the above numbered patent was erroneously issued to "Joseph J. Scheibel", whereas said patent should have been issued to Theophile Gauthreaux, of Chicago, Illinois, as assignee by mesne assignments of the entire interest in said invention, as shown by the records of assignments in this office; and that the said Letters Patent should be read with this correction therein that the same may conform to the record of the case in the Patent Office.

Signed and sealed this 22nd day of November, A. D. 1932.

M. J. Moore,
Acting Commissioner of Patents.

(Seal)